3,258,229
MANUALLY ACTUATED FLUID OPERATOR VALVE
William C. Larson, Utica, Mich., assignor to Holley Carburetor Company, Warren, Mich., a corporation of Michigan
Filed July 30, 1964, Ser. No. 386,242
3 Claims. (Cl. 244—134)

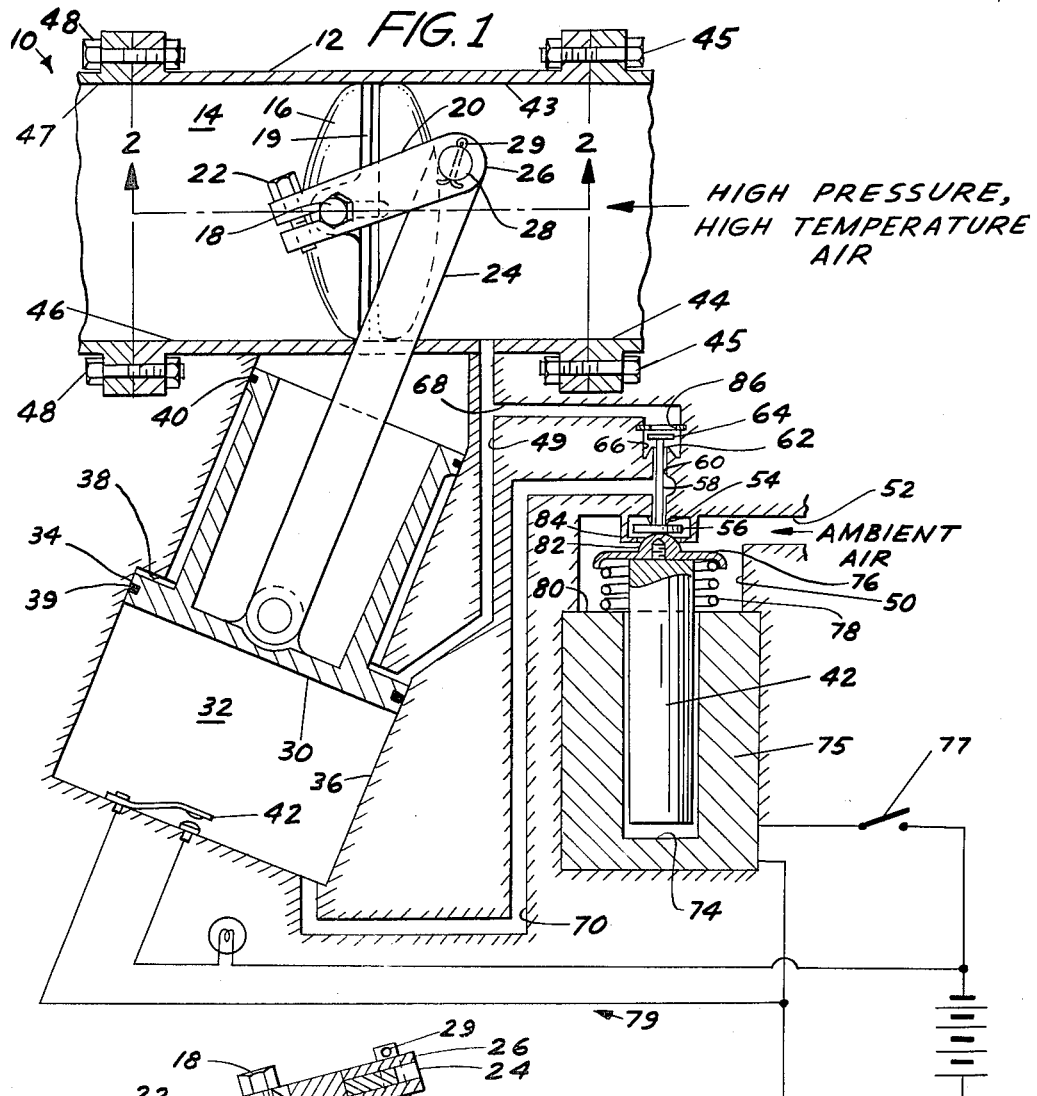

This invention relates generally to valves, and more particularly to manually actuated, fluid operated valves.

It has been found that there is a need for a valve of this type to control the flow of air from a gas turbine engine compressor, to prevent or eliminate ice formation on various aircraft surfaces. Such a valve may be operated by the same high temperature, high pressure air which it supplies through suitable duct work to those areas of the aircraft which normally are subjected to icing during certain conditions of operation. That is, the invention utilizes the ever present compressor air which, because of its high pressure characteristic, is suitable for actuating a piston and which, because of its high temperature, is ideal for melting ice or preventing the formation thereof. Previously, anti-icing valves have been operated by various means, such as an electric motor, which has not performed satisfactorily under all aircraft operating conditions.

It should be understood, however, that such a valve may be used in other applications wherein it is desired to control the flow of air from any usable source.

Accordingly, a general object of the invention is to provide an air flow control device which may be operated by high pressure compressor air and which, when actuated, dispenses the same high temperature, high pressure compressor air into suitable ducts leading to the surfaces subject to icing, thereby heating those surfaces and thus preventing or melting any ice which may form thereon.

A further object of the invention is to provide such a device which is compact in size and efficient in operation under all flying conditions.

A more specific object of the invention is to provide such a device which includes a double poppet valve, alternately opened and closed by the manual energiaztion and de-energization of a spring loaded solenoid, for the purpose of permitting the communication of either high pressure compressor air or ambient air to one side of a piston which, in turn, through suitable linkage means rotates a butterfly valve into an open or a closed position, thereby controlling the flow of the same high temperature, high pressure air.

Other objects and advantages of the invention will become more apparent when reference is made to the following specification and the accompanying drawings, wherein:

FIGURE 1 is a schematic representation of the invention;

FIGURE 2 is a view taken along the plane of line 2—2 of FIGURE 1, as if FIGURE 1 were a side elevational view, and looking in the direction of the arrows.

Referring now to the figures in greater detail, FIGURE 1 illustrates an anti-icing valve assembly 10 including a housing 12 containing a relatively large passageway 14, wherein a butterfly valve 16 is mounted on a pivot device 18 which is supported at its ends in opposing walls of the housing 12. Leakage past the closed butterfly valve 16 is prevented by a seal 19. A bell crank 20 is fixedly secured to one of the ends of the pivot device 18 outside the housing 12 by some suitable means such as a bolt 22. A connecting rod 24 is pivotally connected at its one end to an end 26 of the bell crank 20 by means of a pivot pin 28 and a suitable retaining means, such as cotter pins 29. The other end of the connecting rod 24 is fixedly secured to a two-diameter piston 30 which is slidably mounted in a two-diameter chamber 32.

The larger diameter portion 34 of the piston 30 serves as a movable wall which divides the larger diameter portion of the two-diameter chamber 32 into two variable chambers 36 and 38. A suitable seal 39 may surround the larger diameter portion 34 to prevent leakage between chambers 36 and 38. A seal 40 may likewise surround the smaller diameter end of the piston 30 to prevent leakage from the chamber 38. A switch 42 may be mounted in the chamber 36 opposite the piston 30 for a purpose to be described.

The passageway 14 includes an inlet 43 which receives high pressure, high temperature air from a gas turbine engine compressor discharge through suitable conduitry. The compressor and the conduitry are represented generally by reference numeral 44, and the housing 12 may be fastened thereto by any suitable means, such as bolts 45. The passageway 14 also includes an outlet 46 which at times serves to conduct the high pressure hot air to any desired surfaces of the aircraft (not shown) through a suitable duct 47, the latter being fastened to the housing 12 by any suitable means, such as bolts 48. A passageway 49 communicates between the inlet 44 side of the butterfly valve 14 and the chamber 38.

A chamber 50 is exposed to ambient air through a passageway 52. An opening 54 in the chamber 50 forms a seat for a valve 56, and a stem 58 extends from the valve 56 through a passageway 60 leading from the opening 54. The other end 62 of the passageway 60 forms a seat for a valve 64 which is secured to the other end of the stem 58 in a chamber 66, and a passageway 68 communicates between the chamber 66 and the passageway 49. A passageway 70 communicates between the passageway 60 and the variable piston chamber 36.

A movable solenoid core 72, slidably mounted in the chamber 74 within the windings 75, extends into the chamber 50. A member 76 is provided on the end of the core 72 to serve as a spring retainer for a spring 78 which is mounted against a wall 80 of the chamber 50. A projection 82 may be formed on the member 76 for at times contacting the valve 56. Retainers 84 and 86 located in the chambers 50 and 66, respectively, serve to limit the respective movements of the valves 56 and 64 away from their respective seats 54 and 62.

*Operation*

So long as the solenoid windings 75 are not energized, the spring 78 will retain the projection 82 in contact with the valve 56, holding it closed against its seat 54. This retains the valve 64 off its seat 62 and permits high pressure air from the inlet 44 of the passageway 12, which is in continual communication with the variable piston chamber 38, to flow to the other variable piston chamber 36 through the passageway 68, into the chamber 66, past the valve 64 and through the passageways 60 and 70. Under the force of this high pressure air from below, the piston 30 is moved upwardly until the upper side of the large piston diameter portion 34 contacts the upper side of the variable chamber 38. This closes the butterfly valve 16 in the passageway 14 through the connecting rod 24 and the bell crank 20.

When the pilot feels that selected surfaces of the aircraft should be subjected to hot air, to prevent or eliminate icing, he manually energizes the solenoid by closing the switch 77. This pulls the solenoid core 72 downwardly in the chamber 74 against the force of the spring 78. The double poppet valves 54 and 56 will thereupon snap downwardly, under their own weight and as well as due to the high pressure acting on the top surface of the valve 64. This, of course, closes the valve 64 and opens the valve 56, thereby communicating the variable piston chamber 36 with ambient pressure via the inlet 52, the chamber 50 and the passageways 60 and 70. When this occurs, the high pressure air, which is continually communicated to the variable chamber 38 via the passageway 49, will force the piston 30 downwardly in FIGURE 1 so as to pull the connecting rod downwardly, thereby rotating the bell crank 20 and the associated butterfly valve 16 until the latter is fully open in the passageway 14. The high temperature air from the compressor discharge section is now free to flow through the passageway 14, out the outlet 46, into the duct 47 to the selected surfaces of the aircraft.

The simple electrical circuitry for the valve system is designated generally as 79. Since the piston 30 moves to the bottom of chamber 36 when the butterfly valve 16 is open, it may close the switch 42 so as to signal the pilot that the system is operating.

From the above description, it is apparent that the invention provides a novel, simple and efficient anti-icing valve arrangement which, upon being actuated manually by the pilot, utilizes the high pressure hot air from the compressor to operate a piston and butterfly valve combination which, in turn, permits the hot air to flow to selected aircraft surfaces.

Although but one embodiment of the invention has been shown and described it is obvious that other modifications are possible within the scope of the appended claims.

What I claim as my invention is:

1. An anti-icing or de-icing system for an aircraft driven by a gas turbine engine having a compressor discharging high pressure and high temperature air, said system comprising a first conduit adapted to direct said compressor discharge air to the aircraft surfaces to be de-iced, first valve means in said conduit for controlling the flow of said air therethrough, a piston connected to operate said first valve means, a second passage for continually communicating said compressor discharge air to one side of said piston, a third passage for at times communicating said discharge air to the other side of said piston, second valve means in said third passage to control the flow of said air therethrough, and means for opening said second valve means and replacing said discharge air in said third passage with ambient air when it is desired to de-ice, thereby causing said piston to move in a direction to open said first valve means.

2. An anti-icing device, comprising a first passageway, a butterfly valve in said first passageway, a first chamber, a two-diameter piston slidably mounted in said first chamber and operatively connected to said butterfly valve, a second passageway for communicating between said first passageway and said first chamber on the smaller area side of the large diameter portion of said piston, a second chamber, a solenoid slidably mounted in said second chamber, a collar formed on said solenoid, a projection formed on said collar, an opening to the atmosphere formed in said second chamber, a third chamber, a third passageway for communicating between said second and third chambers, a double poppet valve reciprocably mounted in said third passageway for alternately communicating said third passageway with said second and third chambers, a spring retained by said collar for urging said projection into contact with said double poppet valve, a fourth passageway for communicating between said third chamber and second passageway, a fifth passageway for communicating between said third passageway and said first chamber on the larger area side of said large diameter portion of said piston.

3. An anti-icing or de-icing system for an aircraft driven by a gas turbine engine having a compressor discharging high pressure and high temperature air, said system comprising a first conduit adapted to direct said compressor discharge air to the aircraft surfaces to be de-iced, first valve means in said conduit for controlling the flow of said air therethrough, a dual area piston connected to operate said first valve means, a second passage for continually communicating said compressor discharge air to the smaller area side of said piston, a third passage for at times communicating said discharge air to the larger area side of said piston, second valve means in said third passage to control the flow of said air therethrough, and means for opening said second valve means and replacing said discharge air in said third passage with ambient air when it is desired to de-ice, thereby permitting the air on said smaller area side of said piston to move said piston in a direction to open said first valve means.

References Cited by the Examiner
UNITED STATES PATENTS

| | | | |
|---|---|---|---|
| 824,658 | 6/1906 | Junggren | 251—30 |
| 1,756,824 | 4/1930 | Hasemann | 251—30 X |
| 1,887,322 | 11/1932 | Nettleton. | |
| 2,563,054 | 8/1951 | Messinger et al. | 244—134 |
| 2,650,617 | 9/1953 | Wasser | 251—129 |
| 2,732,165 | 1/1956 | Collingwood | 251—30 X |

FERGUS S. MIDDLETON, *Primary Examiner.*

MILTON BUCHLER, *Examiner.*

D. P. NOON, B. BELKIN, *Assistant Examiners.*